United States Patent [19]

Herbst et al.

[11] Patent Number: 4,802,971

[45] Date of Patent: Feb. 7, 1989

[54] SINGLE RISER FLUIDIZED CATALYTIC CRACKING PROCESS UTILIZING HYDROGEN AND CARBON-HYDROGEN CONTRIBUTING FRAGMENTS

[75] Inventors: Joseph A. Herbst, Turnersville; Hartley Owen, Belle Mead, both of N.J.; Paul H. Schipper, Wilmington, Del.

[73] Assignee: Mobil Oil Corporation, New York, N.Y.

[21] Appl. No.: 144,708

[22] Filed: Jan. 14, 1988

Related U.S. Application Data

[63] Continuation of Ser. No. 903,183, Sep. 3, 1986, abandoned.

[51] Int. Cl.$^4$ .................. C10G 51/04; C10G 51/06
[52] U.S. Cl. .................. 208/13; 208/72; 208/78; 208/79; 208/85; 208/120; 208/75
[58] Field of Search .................. 208/120, 113, 85, 72, 208/74, 73, 67, 75, 78, 79

[56] References Cited

U.S. PATENT DOCUMENTS

| | | | |
|---|---|---|---|
| 3,617,497 | 11/1971 | Bryson et al. | 208/80 |
| 3,748,251 | 7/1973 | Demmel et al. | 208/74 |
| 3,821,103 | 6/1974 | Owen et al. | 208/72 |
| 3,847,793 | 11/1974 | Schwartz et al. | 208/74 |
| 3,849,291 | 11/1974 | Owen | 208/78 |
| 3,894,931 | 7/1975 | Nace et al. | 208/73 |
| 3,894,932 | 7/1975 | Owen | 208/74 |
| 3,894,933 | 7/1975 | Owen et al. | 208/77 |
| 3,894,934 | 7/1975 | Owen et al. | 208/78 |
| 3,894,935 | 7/1975 | Owen | 208/78 |
| 3,926,778 | 12/1975 | Owen et al. | 208/74 |
| 3,928,172 | 12/1975 | Davis, Jr. et al. | 208/77 |
| 3,974,062 | 8/1976 | Owen et al. | 208/74 |
| 4,032,432 | 6/1977 | Owen | 208/67 |
| 4,116,814 | 9/1978 | Zahner | 208/78 |
| 4,287,088 | 9/1981 | Sirkar | 208/52 CT |
| 4,309,279 | 1/1982 | Chester et al. | 208/120 |
| 4,368,114 | 1/1983 | Chester et al. | 208/120 |
| 4,427,539 | 1/1984 | Busch et al. | 208/73 |
| 4,490,241 | 12/1984 | Chou | 208/75 |
| 4,717,466 | 1/1988 | Herbst et al. | 208/113 |

FOREIGN PATENT DOCUMENTS

| | | | |
|---|---|---|---|
| 0074501 | 3/1983 | European Pat. Off. | 208/120 |
| 0101553 | 2/1984 | European Pat. Off. | 208/120 |
| 0171460 | 2/1986 | European Pat. Off. | 208/120 |
| 2298595 | 1/1975 | France | 208/120 |

*Primary Examiner*—Anthony McFarlane
*Attorney, Agent, or Firm*—Alexander J. McKillop; Michael G. Gilman; Richard D. Stone

[57] ABSTRACT

A catalytic cracking process is disclosed which comprises:

(a) thermally and/or catalytically cracking a hydrogen-rich hydrocarbon feed in the lower region of a riser reactor in the presence of a catalyst composition comprising a first catalyst component, and, optionally, a second catalyst component, said first catalyst component being an amorphous cracking catalyst and/or large pore crystalline cracking catalyst, said second catalyst component being a shape selective medium pore crystalline silicate zeolite catalyst, to provide a gasiform material contributing hydrogen species and/or carbon-hydrogen fragments; and, (b) catalytically cracking a thermally treated heavy hydrocarbon feed in a higher region of the riser in the presence of said catalyst composition and gasiform material to provide gasoline boiling range material in increased yield and/or of higher quality.

16 Claims, 1 Drawing Sheet

SINGLE RISER FLUIDIZED CATALYTIC CRACKING PROCESS UTILIZING HYDROGEN AND CARBON-HYDROGEN CONTRIBUTING FRAGMENTS

This is a continuation of copending application Ser. No. 903,183, filed on Sept. 3, 1986 now abandoned.

BACKGROUND OF THE INVENTION

This invention relates to a single riser catalytic cracking operation in which mobile hydrogen and/or carbon-hydrogen molecular fragments are employed to increase conversion of a hydrogen-deficient heavy hydrocarbon feed, e.g., a resid, to useful products contributing to gasoline boiling range material.

In known and conventional fluidized catalytic cracking processes, a relatively heavy hydrocarbon feedstock, e.g., a gas oil, admixed with a suitable cracking catalyst to provide a fluidized suspension, is cracked in an elongated reactor, or riser, at elevated temperature to provide a mixture of lighter hydrocarbon products. The gasiform reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbon product from the spent catalyst prior to conveying the latter to a catalyst regenerator unit, an inert stripping gas, e.g., steam, is passed through the catalyst where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Particular examples of such catalytic cracking processes are disclosed in U.S. Pat. Nos. 3,617,497, 3,894,923, 4,051,013, 4,309,279 and 4,368,114 (single risers) and U.S. Pat. Nos. 3,748,251, 3,849,291, 3,894,931, 3,894,933, 3,894,934, 3,894,935, 3,926,778, 3,928,172, 3,974,062 and 4,116,814 (multiple risers).

In accordance with the fluid catalytic cracking process of U.S. Pat. No. 4,051,013, a naphtha feed and a gas oil feed are converted in the presence of amorphous or zeolite cracking catalyst, preferably the latter, in a riser reaction zone to provide a high octane gasoline.

Several of the aforementioned catalytic cracking processes employ a mixture of catalysts having different catalytic properties as, for example, the process described in U.S. Pat. No. 3,894,934 which utilizes a mixture of a large pore crystalline silicate zeolite cracking catalyst such as zeolite Y and shape selective medium pore crystalline silicate zeolite such as ZSM-5. The combined catalyst system (or mixture) produces a gasoline product of relatively high octane rating.

It is known to upgrade hydrogen-deficient heavy hydrocarbon feedstocks such as gas oils, resid, syncrudes, etc., to more valuable products by thermal and catalytic cracking operations in admixture with a hydrogen donor diluent material. The hydrogen donor diluent is hereby defined as a material, which releases hydrogen to a hydrogen-deficient oil in a thermal or catalytic cracking operation.

One advantage of a hydrogen donor diluent operation is that it can be relied upon to convert heavy oils or hydrogen-deficient oils at relatively high conversions in the presence of catalytic agents with reduced coke formation. Coke as formed during the cracking operation is usually a hydrocarbonaceous material sometimes referred to as a polymer of highly condensed, hydrogen-poor hydrocarbons.

Catalytic cracking systems in current operation, e.g., those referred to above, have take advantage of new catalyst developments, that is, the use of large pore crystalline silicate zeolite cracking catalysts in preference to the earlier used amorphous silica-alumina cracking catalysts. These new crystalline zeolite cracking catalysts, e.g., zeolites X and Y, are generally regarded as low coke producing catalysts. Thus, as the level of coke deposits has been reduced through the use of crystalline zeolite cracking catalysts, it has been equally important to concentrate on recovering the maximum amount of heat available through the burning of deposited coke in the regenerator. However, when operating a catalytic cracking process within optimum conditions provided by the crystalline zeolite conversion catalysts, the petroleum refiner is still faced with operating a hydrogen-deficient process which does not permit the most optimistic recovery of desired products.

In accordance with the hydrocarbon conversion process described in U.S. Pat. No. 4,035,285, a low molecular weight carbon-hydrogen contributing material and a high molecular weight feedstock, e.g., a gas oil, are combined and reacted in the presence of one or more crystalline silicate zeolite catalysts, e.g., zeolite Y, in admixture with ZSM-5, the resulting cracking and carbon-hydrogen additive reactions producing products of improved quality and superior to those formed in the absence of the low molecular weight carbon-hydrogen contributing material. Advantages of the process include improved crackability of heavy feedstocks, increased gasoline yield and/or higher gasoline quality (including octane and volatility), and fuel oil fractions of improved yield and/or burning quality and lower levels of potentially polluting impurities such as sulfur and nitrogen. In addition, the need for high pressure hydrotreaters and hydrocrackers using relatively expensive molecular hydrogen-rich gas can be eliminated or the severity requirements of the operation greatly decreased.

A similar process in which full range crude oils and naphtha are catalytically cracked in the presence of such low molecular weight carbon-hydrogen contributing material and zeolites in separate risers of a multiple riser catalytic cracking unit is described in U.S. Pat. No. 3,974,062 referred to supra.

SUMMARY OF THE INVENTION

It is an object of the present invention to carry out a single riser fluidized catalytic cracking operation in which a hydrogen-rich hydrocarbon feed is thermally and/or catalytically cracked in a lower region of the riser to provide a gasiform material contributing mobile hydrogen species and/or carbon-hydrogen fragments for subsequent addition to a thermally treated hydrogen-deficient heavy hydrocarbon feed, e.g., a resid, introduced to a region further up the riser, said gasiform material and thermally treated heavy hydrocarbon feed undergoing conversion under conditions to effect cracking and additive carbon-hydrogen reactions whereby gasoline boiling range material is obtained.

It is another object of the invention to carry out the foregoing fluidized catalytic cracking operation where an additional heavy hydrocarbon feed, e.g., a gas oil, is combined with the up-flowing catalyst-hydrocarbon suspension along with hot, freshly, regenerated cracking catalyst in a region which is still further up the riser, said additional heavy hydrocarbon feed undergoing conversion to gasoline boiling range material.

It is still another object of the invention to carry out a fluidized catalytic cracking process employing a mixed catalyst composition comprising, as a first catalyst component, an amorphous cracking catalyst and/or a large pore crystalline cracking catalyst, e.g., a zeolite such as zeolite X, Y, REY, USY, RE-USY and mixtures (or blends) thereof, and, as a second catalyst component, a shape selective medium pore crystalline silicate zeolite catalyst, e.g., ZSM-5, ZSM-11, ZSM-12, ZSM-23, ZSM-35, ZSM-38, ZSM-48, etc.

It is a particular object of the invention to catalytically crack a resid and/or other heavy hydrocarbon feed which has been subjected to visbreaking prior to its introduction to the riser.

In keeping with these objects, there is provided a catalytic cracking process which comprises:

(a) thermally and/or catalytically cracking a hydrogen-rich hydrocarbon feed in the lower region of a riser reactor in the presence of a catalyst composition comprising a first catalyst component, and, optionally, a second catalyst component, said first catalyst component being an amorphous cracking catalyst and/or large pore crystalline cracking catalyst, said second catalyst component being a shape selective medium pore crystalline silicate zeolite catalyst, to provide a gasiform material contributing hydrogen species and/or carbon-hydrogen fragments; and, (b) catalytically cracking a thermally treated heavy hydrocarbon feed in a higher region of the riser in the presence of said catalyst composition and gasiform material to provide gasoline boiling range material in increased yield and/or of higher quality.

The term "catalyst" as used herein shall be understood to apply not only to a catalytically active material but to one which is composited with a suitable matrix component which may or may not itself be catalytically active.

In contrast to the processes of U.S. Pat. Nos. 3,974,062 and 4,035,285 referred to above which make no provision for thermally treating a heavy hydrocarbon feed prior to its introduction to the catalytic cracking reaction zone, the process of this invention requires that the heavy hydrocarbon feed, e.g., a resid, be thermally treated, e.g., by visbreaking, prior to admixture with the low molecular weight carbon-hydrogen contributing material. Thermal pretreatment of the second heavy hydrocarbon feed has the beneficial result of significantly enhancing the reactivity and susceptibility of the feed for adding low molecular weight carbon-hydrogen fragments. This, in turn, promotes catalytic cracking of the feed to products which contribute to gasoline boiling range material.

BRIEF DESCRIPTION OF THE DRAWING

The attached figure of drawing illustrates a single riser fluidized catalytic cracking process in accordance with this invention.

DESCRIPTION OF THE PREFERRED EMBODIMENTS

Figure 1:
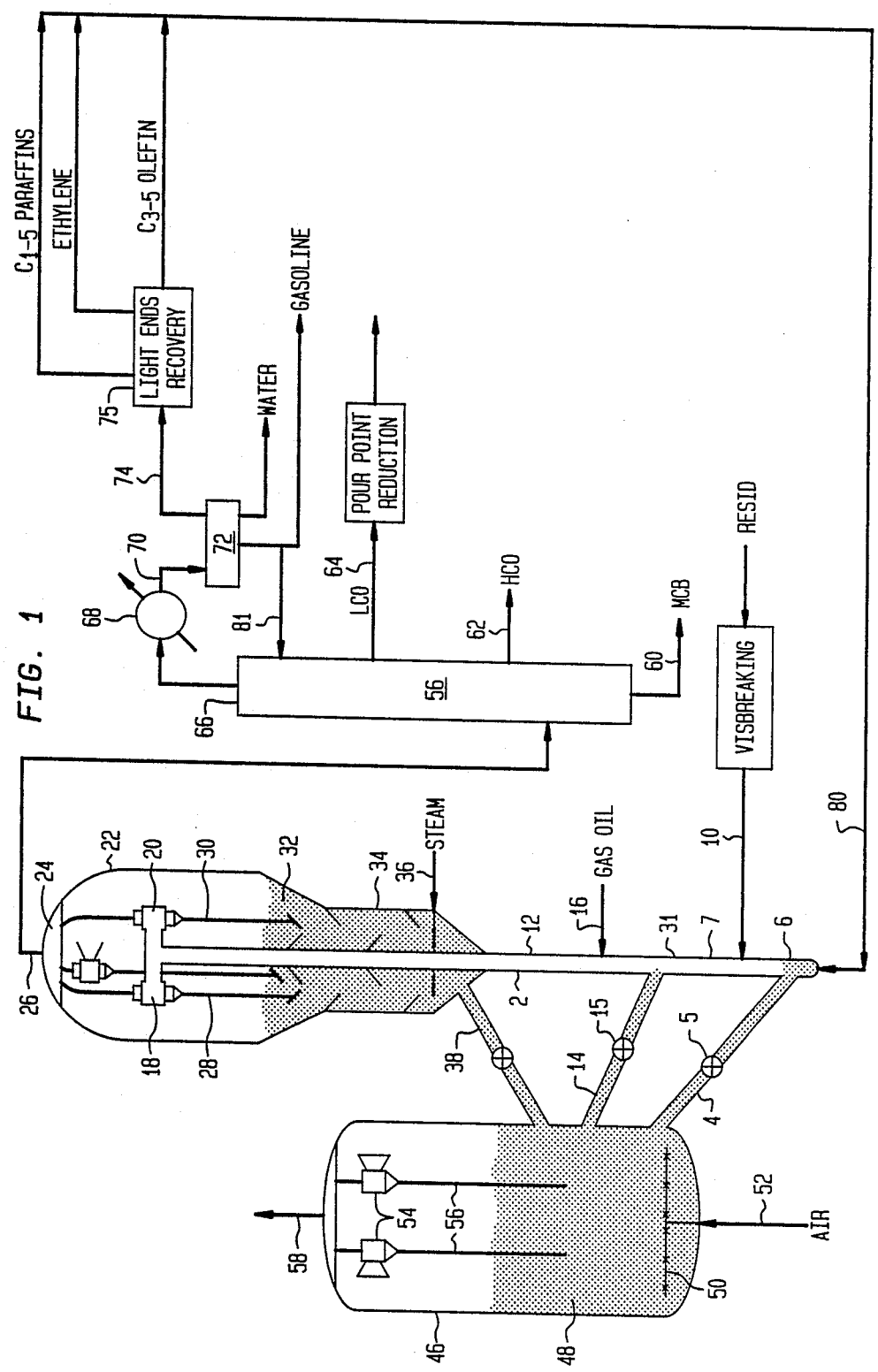

Conventional cracking catalyst components are generally amorphous silica-alumina and crystalline silica-alumina. Other materials said to be useful as cracking catalysts are the crystalline silicoaluminophosphates of U.S. Pat. No. 4,440,871 and the crystalline metal aluminophosphates of U.S. Pat. No. 4,567,029.

However, the major conventional cracking catalysts presently in use generally comprise a large pore crystalline silicate zeolite, generally in a suitable matrix component which may or may not itself possess catalytic activity. These zeolites typically possess an average crystallographic pore dimension of about 7.0 angstroms and above for their major pore opening. Representative crystalline silicate zeolite cracking catalysts of this type include zeolite X (U.S. Pat. No. 2,882,244), zeolite Y U.S. Pat. No 3,130,007), zeolite ZK-5 (U.S. Pat. No. 3,247,195), zeolite ZK-4 (U.S. Pat. No. 3,314,752), merely to name a few, as well as naturally occurring zeolites such as chabazite, faujasite, mordenite, and the like. Also useful are the silicon-substituted zeolites describes in U.S. Pat. No. 4,503,023. Zeolite Beta is yet another large pore crystalline silicate which can constitute a component of the mixed catalyst system utilized herein.

It is, of course, within the scope of this invention to employ two or more of the foregoing amorphous and/or large pore crystalline cracking catalysts as the first catalyst component of the catalyst composition. Preferred crystalline zeolite components of the catalyst composition herein include the natural zeolites mordenite and faujasite and the synthetic zeolites X and Y with particular preference being accorded zeolites Y, REY, USY and RE-USY.

The shape selective medium pore crystalline silicate zeolite catalyst constituting the optional second catalyst component of the mixed catalyst system is exemplified by ZSM-5, ZSM-11, ZSM-12, ZSM-23, ZSM-35, ZSM-38, ZSM-48 and other similar materials. U.S. Pat. No. 3,702,886 describing and claiming ZSM-5 is incorporated herein by reference. Also, U.S. Pat. No. Re. 29,948 describing and claiming a crystalline material with an X-ray diffraction pattern of ZSM-5 is incorporated herein by reference as is U.S. Pat. No. 4,061,724 describing a high silica ZSM-5 referred to as "silicalite" therein.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is more particularly described in U.S. Pat. No. 4,375,573, the entire contents of which are incorporated herein by reference.

The preferred shape selective crystalline silicate zeolites of the catalyst composition herein are ZSM-5, ZSM-11, ZSM-12, ZSM-23, ZSM-35, ZSM-38 and ZSM-48 with ZSM-5 being particularly preferred.

The zeolites suitable for use in the present invention can be modified in activity by dilution with a matrix component of significant or little catalytic activity. It may be one providing a synergistic effect as by large molecule cracking, large pore material and act as a coke sink. Catalytically active inorganic oxide matrix material is particularly desired because of its porosity, attrition resistance and stability under the cracking reaction conditions encountered particularly in a fluid catalyst cracking operation.

The catalytically active inorganic oxide may be combined with a raw or natural clay, a calcined clay, or a clay which has been chemically treated with an acid or an alkali medium or both. The matrix component is combined with the crystalline silicate in such proportions that the resulting product contains up to about 50% by weight of the crystalline silicate material and preferably from about 0.5% up to about 25 weight percent thereof may be employed in the final composite.

In general, the aluminosilicate zeolites are effectively employed herein. However, zeolites in which some other framework element which is present in partial or total substitution of aluminum can be advantageous. For example, such catalysts may provide a higher conversion of feed to aromatic components, the latter tending to increase the octane, and therefore the quality, of the gasoline produced in the process. Illustrative of elements which can be substituted for part or all of the framework aluminum are boron, gallium, zirconium, titanium and other trivalent metals which are heavier than aluminum. Specific examples of such catalysts include ZSM-5 and zeolite Beta containing boron, gallium, zirconium and/or titanium. In lieu of, or in addition to, being incorporated into the zeolite framework, these and other catalytically active elements can also be deposited upon the zeolite by any suitable procedure, e.g., impregnation. Thus, the zeolite can contain a hydrogen-activating function, e.g., a metal function such as platinum, nickel, iron, cobalt, chromium, thorium (or other metal function capable of catalyzing the Fischer-Tropsch or water-gas shift reactions) or rhenium, tungsten, molybdenum (or other metal function capable of catalyzing olefin disproportionation).

Suitable hydrogen-rich hydrocarbon feeds are those containing from about 12 to about 25 weight percent hydrogen, e.g., $CH_4$, $C_2H_6$, $C_3H_8$, light virgin naphtha, and similar materials. Any or all of the $C_{1-5}$ hydrocarbons recovered from the process can be utilized as the hydrogen-rich hydrocarbon feed to the lower region of the riser. Under the conditions prevailing in the lower region of the riser, these and other hydrogen-rich hydrocarbon materials will undergo conversion, e.g., by thermal cracking brought about by the presence of hot, freshly regenerated cracking catalyst in this region and by shape selective catalytic cracking and other types of reactions brought about by the medium pore zeolite catalyst therein, to provide gasiform material contributing mobile hydrogen species and/or carbon-hydrogen fragments.

Suitable charge stocks for cracking in the riser comprise the heavy hydrocarbons generally and, in particular, petroleum fractions having an initial boiling point range of at least about 400° F., a 50% point range of at least about 500° F. and an end point range of at least about 600° F. Such hydrocarbon fractions include gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. In short, any hydrogen-deficient feedstock and preferably one which would require a more conventional high pressure hydrocracking and hydrotreating operation to render the feed suitable for use in a fluid catalytic cracking operation can be used in the process of this invention.

Visbreaking, or viscosity breaking, is a preferred procedure for thermally treating the second heavy hydrocarbon feed prior to its introduction to the riser. Visbreaking is a well known petroleum refining process in which reduced crudes are pyrolyzed, or cracked, under comparatively mild conditions to provide products having lower viscosities and pour points. In a typical visbreaking process, the heavy hydrocarbon feed, e.g., a resid, is passed through a heater and heated from about 425° to about 600° C. at about 450 to about 7000 kPa. Examples of such visbreaking methods are described in Beuther et al., "Thermal Visbraking of Heavy Residues," *The Oil and Gas Journal*, 57:46, Nov. 9, 1959, pp. 151-157; Rhoe et al., "Visbreaking: A Flexible Process," *Hydrocarbon Processing*, January 1979, pp. 131-136; and U.S. Pat. No. 4,233,138, the contents of which are incorporated by refernce herein.

Referring now to the FIGURE, hot regenerated zeolite Y in admixture with ZSM-5 is transferred from regenerator 46 through conduit 4 provided with flow control valve 5 to the lower region 6 of riser 2 where it combines with a hydrogen-rich hydrocarbon feed, e.g., $C_{1-5}$ light hydrocarbons (paraffins and olefins) recovered from gas plant operation 75, introduced therein through conduit 80. Said feed undergoes thermal cracking in lower region 6 due to the presence of the hot catalyst mixture with selective catalytic cracking of paraffinic materials also taking place due to the presence of ZSM-5 in the catalyst mixture. The conditions of conversion of the $C_{1-5}$ light hydrocarbon feed in the lower region of riser 31 can include a temperature of from about 1100° to about 1500° F. and preferably from about 1250° to about 1350° F., a catalyst to feed ratio of from about 50:1 to about 200:1 and preferably from about 100:1 to about 150:1 and a catalyst contact time of from about 10 to about 50 seconds and preferably from about 15 to about 35 seconds. The net result of this thermal/catalytic cracking activity in lower region 6 is to provide mobile hydrogen and/or carbon-hydrogen fragments for addition to the thermally treated heavy hydrocarbon feed introduced further up the riser.

As the catalyst-hydrocarbon suspension formed in lower region 6 of riser 2 continues to ascend the riser, it enters an intermediate region 7 where it is combined with a thermally treated resid feed, e.g., one which has been previously treated by visbreaking in a conventional or otherwise known manner prior to its introduction to the riser through conduit 10. As a result of the visbreaking treatment, the thermally treated resid is rendered significantly more reactive and tends to pick up carbon-hydrogen fragments far more readily than it would in the absence of such treatment. In general, the temperature within intermediate region 7 of riser 2 can be maintained within the range of from about 950° to about 1150° F., preferably from about 1000° about 1100° F., a catalyst to feed ratio of from about 3:1 to about 10:1, preferably from about 4:1 to about 8:1 and a catalyst contact time of from about 0.5 to about 10 seconds, preferably from about 1 to about 5 seconds. The hydrocarbon product/catalyst stream continues upwardly within riser 2 to an upper region 12 thereof where it combines with hot freshly regenerated catalyst transferred from regenerator 46 through conduit 14 provided with valve 15 and with a gas oil introduced through line 16. The conversion conditions in upper region 12 can be essentially the same as those in intermediate region 7. The gas oil undergoes cracking in upper region 12 to provide additional quantities of gasoline boiling range material. The catalyst-hydrocarbon suspension continues to travel up the riser and is ultimately discharged into cyclonic separation zones 18 and 20 housed in the upper portion of vessel 22 wherein separation of catalyst from hydrocarbon vapors is accomplished. Hydrocarbon vapors separated from catalyst then pass into a plenum chamber 24 for removal from the vessel by conduit 26. Catalyst separated from hydrocarbon vapors in cyclonic means 18 and 20 pass by diplegs 28 and 30 to a fluid bed of catalyst 32 maintained in the lower portion of the vessel 22. The fluid bed of catalyst 32 is in open communication with a lower extending stripping zone 34 therebelow to which the fluid bed of catalyst moves generally downward countercurrent to rising stripping gas introduced by conduit 36. The stripping zone is maintained at a temperature within the range of 900° F. to 1150° F. and the higher temperature may be facilitated by the addition of hot regenerated catalyst to the catalyst in the stripping zone by means not shown. Stripped catalyst is removed from a bottom portion of the stripping zone by conduit 38 for transfer to regenerator 46.

Catalyst particles comprising particularly the zeolite Y cracking component of the catalyst composition accumulate a relatively high level of entrained hydrocarbonaceous material therein which is subsequently removed therefrom by regeneration with oxygen-containing regeneration gases. The stripped catalyst particles are passed by conduit 38 to a catalyst regeneration unit represented by regenerator 46 containing a dense fluid bed of catalyst 48. Regeneration gas such as air is introduced to the lower portion of regenerator 46 by air distributor 50 supplied by conduit 52. Cyclone separators 54 provided with diplegs 56 separate entrained catalyst particles from flue gases and return the separated catalyst to the fluid bed of catalyst. Flue gases pass from the cyclones into a plenum chamber and are removed therefrom by conduit 58. Hot regenerated zeolite Y catalyst is returned to the lower and upper regions of riser 2 by conduits 4 and 14, respectively, as discussed above to participate in another cycle of conversion.

The hydrocarbon products of conversion are conveyed from plenum chamber 24 through conduit 26 and are introduced to fractionation zone 56 where a separation of the products is made. Main column bottoms (MCB) are conveyed from the fractionator by conduit 60 for recycle to riser 2 through conduit 16 or for some other use. A heavy oil HCO product is withdrawn by conduit 62. A light cycle oil (LCO) product is withdrawn by conduit 64. An overhead fraction lower boiling than the light cycle oil and comprising gasoline and lower boiling hydrocarbons are withdrawn from an upper portion of fractionator 56 by conduit 66. The withdrawn material in conduit 66 passes through cooler 68 and conduit 70 to knockout drum 72 wherein condensed liquids such as water and gasoline boiling material are separated from lower boiling gaseous components. The low boiling gaseous components are withdrawn by conduit 74 for passage to a light ends recovery operation 75 wherein a separation is made to recover, for example, $C_{1-5}$ paraffins for recycle through conduit 80. A gasoline boiling range fraction separated in drum 72 is recycled by conduit 81 as reflux to the fractionator tower.

Having thus provided a general discussion of the present invention and described specific embodiments in support thereof, it is to be understood that no undue restrictions are to be imposed by reason thereof except as provided by the following claims.

What is claimed is:

1. A riser catalytic cracking process which comprises
   (a) generating at least one of hydrogen species and carbon-hydrogen fragments by cracking in the base of the riser a hydrogen-rich hydrocarbon feed containing 12 to 25 weight percent hydrogen, in the presence of a mixture of cracking catalysts of comprising (1) at least one member of the group selected from amorphous cracking catalysts, large pore crystalline cracking catalysts and admixtures thereof and (2) a shape selective zeolite catalyst wherein said generated hydrogen species and carbon-hydrogen fragments from an intermediate product; and,
   (b) contacting the mixture of catalyst and intermediate product with a thermally treated heavy hydrocarbon feed downstream of the base of the riser and catalytically cracking the heavy feed to lighter products.

2. The process of claim 1 wherein the hydrogen-rich feed comprises one or more $C_1$–$C_5$ hydrocarbons recovered from the process.

3. The process of claim 1 wherein the thermally treated heavy hydrocarbon feed is more reactive than feed which has not been thermally treated.

4. The process of claim 3 wherein the thermal treatment is visbreaking.

5. The process of claim 1 wherein the heavy feed is a resid.

6. The process of claim 5 wherein an additional heavy hydrocarbon feed is added to the riser downstream of the point of addition of the resid and the added heavy hydrocarbon feed is catalytically cracked in the presence of hot freshly regenerated catalyst.

7. The process of claim 6 wherein the added heavy feed is a gas oil.

8. The process of claim 1 wherein the cracking catalyst of (1) comprises a large pore zeolite.

9. The process of claim 1 wherein the cracking catalyst of (1) comprises a large pore zeolite selected from the group consisting of zeolite X, Y, REY USY, RE-USY, mordenite and mixtures thereof and the shape selective zeolite (2) is selected from the group consisting of ZSM-5, ZSM-11, ZSM-12, ZSM-23, ZSM-35, ZSM-38, and ZSM-48.

10. The process of claim 9 in which the shape selective zeolite contains at least one element selected from the group consisting of boron, gallium, zirconium and titanium.

11. The process of claim 1 wherein hydrogen-rich feed is catalytically cracked in the base of the riser at a temperature of about 1100°–1500° F., a catalyst to hydrogen-rich feed weight ratio of about 50:1 to 200:1 and a catalyst contact time of about 10–50 seconds.

12. The process of claim 11 wherein the temperature is about 1250° to 1350° F., the catalyst hydrogen-rich feed weight ratio is about 100:1 to 150:1 and the catalyst contact time is about 15 to 35 seconds.

13. The process of claim 1 wherein the catalytic cracking of thermally treated heavy hydrocarbon feed occurs at a temperature of about 950° to 1150° F., the catalyst thermally-treated heavy hydrocarbon feed weight ratio is about 3:1 to 10:1 and the catalyst contact time is about 0.5 to 10 seconds.

14. The process of claim 13 wherein the temperature is about 1000° to 1100° F., the catalyst:thermally-treated heavy hydrocarbon feed weight ratio is about 3:1 to 10:1 and the catalyst contact time is about 1 to 5 seconds.

15. The process of claim 6 wherein the additional heavy hydrogen feed is catalytically cracked at a temperature of about 950° to 1150° F., a catalyst to hydrocarbon weight ratio of about 3:1 to 10:1 and a catalyst contact time of about 0.5 to 10 seconds.

16. The process of claim 15 wherein the temperature is 1000° to 1100° F., the total catalyst to hydrocarbon weight ratio is about 4:1 to 8:1 and the catalyst contact time is about 1 to 5 seconds.

* * * * *